(No Model.)
A. ANDERSON.
TROLLEY FOR ELECTRIC RAILWAY SERVICE.
No. 412,155. Patented Oct. 1, 1889.
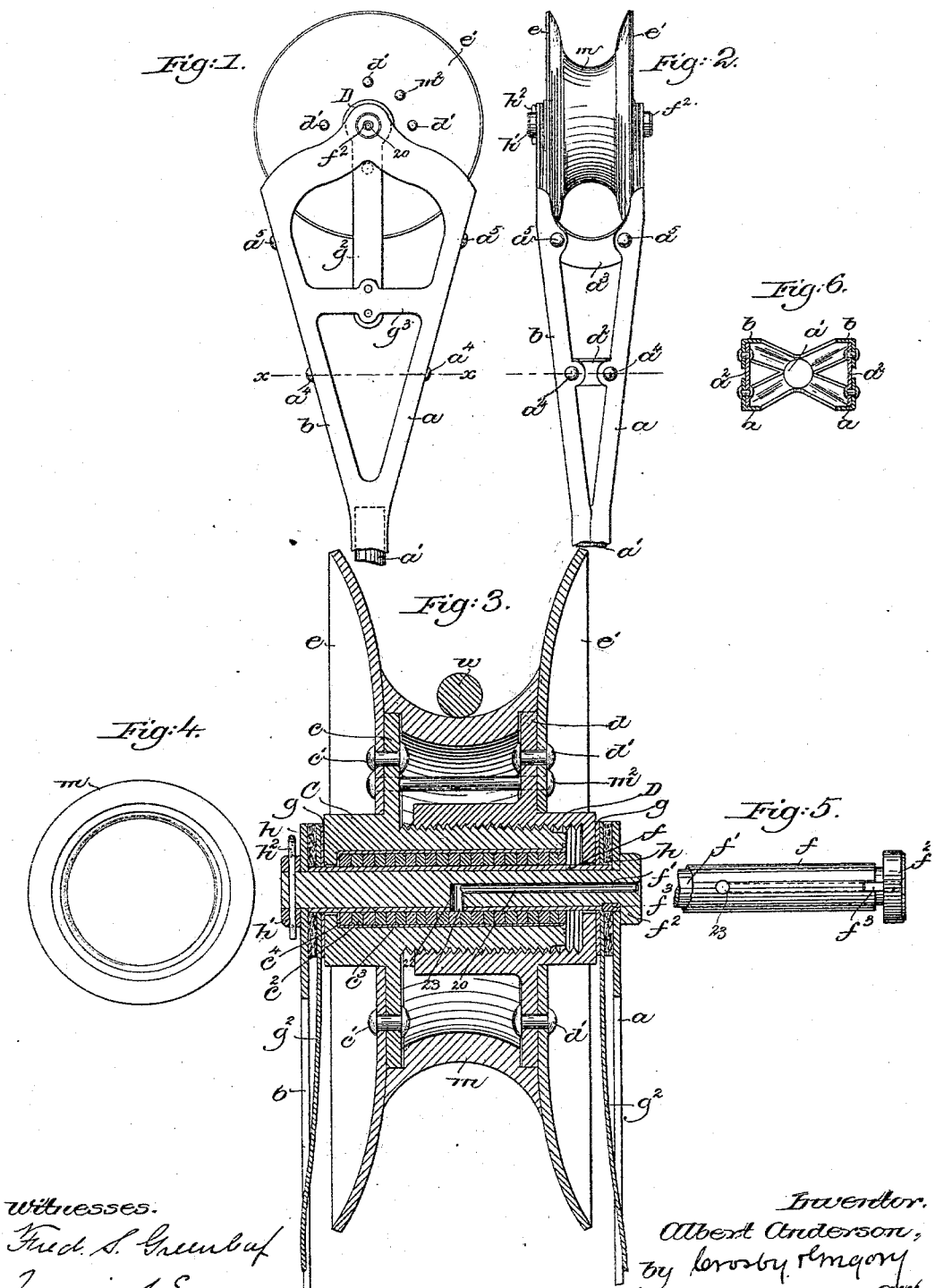

UNITED STATES PATENT OFFICE.

ALBERT ANDERSON, OF BOSTON, MASSACHUSETTS, ASSIGNOR TO CHARLES L. EDGAR, TRUSTEE, OF SAME PLACE.

TROLLEY FOR ELECTRIC-RAILWAY SERVICE.

SPECIFICATION forming part of Letters Patent No. 412,155, dated October 1, 1889.

Application filed May 21, 1889. Serial No. 311,579. (No model.)

*To all whom it may concern:*

Be it known that I, ALBERT ANDERSON, of Boston, county of Suffolk, State of Massachusetts, have invented an Improvement in Trolleys for Electric-Railway Service, of which the following description, in connection with the accompanying drawings, is a specification, like letters on the drawings representing like parts.

Trolley-wheels used in connection with and to roll over electric wires or conductors wear very rapidly where they contact with the wire or conductor and become unserviceable long before other parts of the trolley are at all injured by wear. So, also, owing to the great speed at which the trolley has to travel, the parts at the hub of the trolley are subjected to great wear, the trolleys as now made lasting but a very short time.

In my efforts to improve the durability of a trolley I have provided the same with a detachable contact-shell, made, preferably, as a ring, somewhat concaved at its periphery, the said shell being easily removed from or applied in position between the usual flanges or sides of the trolley and its hub or axle. I have also provided the trolley-hub with a non-metallic bearing of insulating material. I have also made the trolley-frame of sheet-steel struck into shape and tied together by suitable braces, thus making a very light trolley, and I have made the trolley-frame tapering, so that it cannot catch and hang upon the wire, especially an overhead wire.

Figure 1 in side elevation represents the main part of a trolley and its frame embodying my invention. Fig. 2 is a view of the trolley shown in Fig. 1, looking at it from the left. Fig. 3 is an enlarged sectional detail of the trolley and part of the frame, the wire or conductor being also shown in section. Fig. 4 is a side elevation of the contact-shell removed from Fig. 1. Fig. 5 is a detail, to be referred to, of the pin on which the trolley-wheel rotates; and Fig. 6 is a section of the trolley-frame on the dotted line $x$.

The trolley-frame herein represented is composed of two parts $a\ b$, each composed of sheet-steel cut out to present a tapering shape, as best represented in the drawings, Fig. 1, the edges of the pieces $a\ b$ being flanged or turned over, as best shown in Fig. 2, and in the section Fig. 6, and to add strength to the said frame the lower portions of the two parts so made will in practice be welded to a rod or holder of iron, as $a'$, partially shown in Fig. 1, which rod will enter or engage with the arm which extends to the car.

The two sides $a\ b$ of the trolley-frame are connected together by suitable links or straps $a^2\ a^3$ and rivets $a^4\ a^5$.

The hub of the trolley-wheel is made in two parts, marked C D. The part C has an annular projection $c$, to which is connected by suitable rivets $c'$ the flange $e$, forming one side of the trolley-wheel.

The central portion of the parts C of the hub is chambered, as represented in Fig. 3, to receive within it an anti-friction bearing, as $c^2$, the material whereof is an insulating material, the material employed by me being preferably rawhide in the form of a series of washers or rings packed into a metallic tube, as $c^3$, one end of the said tube, as at $c^4$, being flanged or spun over to form a lip to aid in removing the anti-friction bearing when desired.

Instead of rawhide disks I may employ other non-metallic insulating material—such, for instance, as leatheroid, leather board, or other substances commonly used for bearings.

The exterior of the cylindrical portion C of the hub is represented as screw-threaded to receive upon it the screw-threaded tubular part of the portion D of the hub, the latter portion having an annular projection, as $d$, to which by suitable rivets $d'$ is attached the flange $e'$, forming the other half or side of the trolley. The flanges $e\ e'$ are preferably cut from sheet-steel.

The upper end of the trolley-frame is bored or provided with suitable holes in line for the reception of the pin or axle about which the trolley-wheel rotates, the said pin or axle, as herein shown, being composed of two parts— namely, a tube $f$ and a central pin $f'$. The part $f'$ has at one end a head, as $f^2$, provided with a pin or projection, as $f^3$, which is long enough to pass from the side of the trolley-frame and enter a notch in the end of the tubular portion $f$, as best shown in Fig. 5, thus preventing the tubular portion rotating upon the central portion $f'$, so that the wear comes entirely upon the tubular portion $f$, and the wear is only that between such portion and the friction-bearing portion $c^2$ within the hub.

As constructed, it will be readily understood that a new tube $f$ may be readily inserted in case of wear, and also a new bearing-surface may be readily inserted by pulling out the sleeve or tube $c^3$, which is accessible readily from one end of the portion C of the hub when the latter has been screwed out of the portion D.

The portion C D of the hub will preferably be of brass, and at the ends of the hubs I prefer to add copper disks, as $g$, against the outer sides of which bear the copper or other equivalent brushes $g^2$, which brushes extend down to and are connected with the cross-bar $g^3$ of the trolley-frame at each side, so that the electric current may readily pass from the wire or conductor $w$ through the trolley-wheel, thence along the brushes $g^2$ to the trolley-frame, and thence in usual manner to the motor on the car. Between the brushes and the trolley-frame, about the sleeve $f$, I prefer to place a leather or other frictional washer, as $h$. Upon the end of the part $f'$ of the pin opposite that having the head $f^2$, I place a washer $h'$ and confine it in place by a suitable linchpin $h^2$.

Great wear, as stated, comes upon that part of the wheel which runs in contact with the wire or conductor $w$, and to enable this wear to be compensated for I have provided the trolley-wheel with a removable annular contact-shell $m$, preferably of cast-brass, the said contact-shell being placed between the flanges of the trolley and preferably supported by the annular projections $c$ $d$ when the two parts C D of the hub of the trolley are screwed together, as represented in Fig. 3.

The two parts C D of the trolley-hub are screwed together with very considerable force, so as to bind the contact-shell firmly in place and prevent rotation of the same independently of the hub.

A cross pin or bolt $m^2$ will preferably be inserted through holes made in the trolley-wheel after the parts of the same have been screwed firmly together.

The trolley cannot be taken apart except by the removal of the bolt or pin $m^2$. The pin or bolt $m^2$ is not absolutely necessary.

The contact-shell referred to may be replaced whenever worn.

Referring again to the pin composed of the parts $f'$ and $f$, it will be noticed that the part $f'$ has a hole 20 through it centrally from one toward its other end, and other holes intersect the central hole radially, and the part $f$ also has holes made through it.

Oil may be injected into the central hole 20 of the part $f'$ of the pin or axle and pass through the holes described and lubricate the anti-friction bearing or rawhide disks.

I claim—

1. The combination, with the chambered hub of a trolley-wheel, of an insulating non-metallic bearing, substantially as described.

2. The combination, with the hub of a trolley-wheel, of a detachable annular contact-shield, substantially as described.

3. The divided hub of the trolley-wheel and the attached side flanges, combined with a detachable annular contact-shield clamped between the said hub and side flanges, substantially as described.

4. In a trolley-wheel, a divided hub, chambered as described, combined with a removable tube and a series of non-metallic washers contained therein, substantially as described.

5. The separable trolley-hub, chambered as described, and a series of non-metallic washers therein, combined with a two-part pin or axle $ff'$, to operate substantially as described.

6. The combination, with a trolley-wheel and pivot or axle therefor, of a trolley-frame composed of sheet metal having flanged edges united together, substantially as described, and brushes $g^2$, to connect the hub of the trolley-wheel with the trolley-frame, substantially as described.

7. The combination, with the trolley-wheel, of a sheet-metal trolley-frame having overturned flanges and made tapering, substantially as described, from its end between which the trolley-wheel runs toward its opposite end, the sides being rigidly connected by straps attached to the flanges, substantially as described.

8. The combination, with a trolley-frame and trolley-wheel, of metallic conducting-brushes $g^2$ between the hubs of the trolley-wheel and the said frame, to operate substantially as described.

In testimony whereof I have signed my name to this specification in the presence of two subscribing witnesses.

ALBERT ANDERSON.

Witnesses:
BERNICE J. NOYES,
F. L. EMERY.